H. T. BRADY AND D. A. BENWAY.
FRONT AXLE FOR MOTOR VEHICLES.
APPLICATION FILED APR. 28, 1921.
1,438,214.
Patented Dec. 12, 1922.
2 SHEETS—SHEET 1.
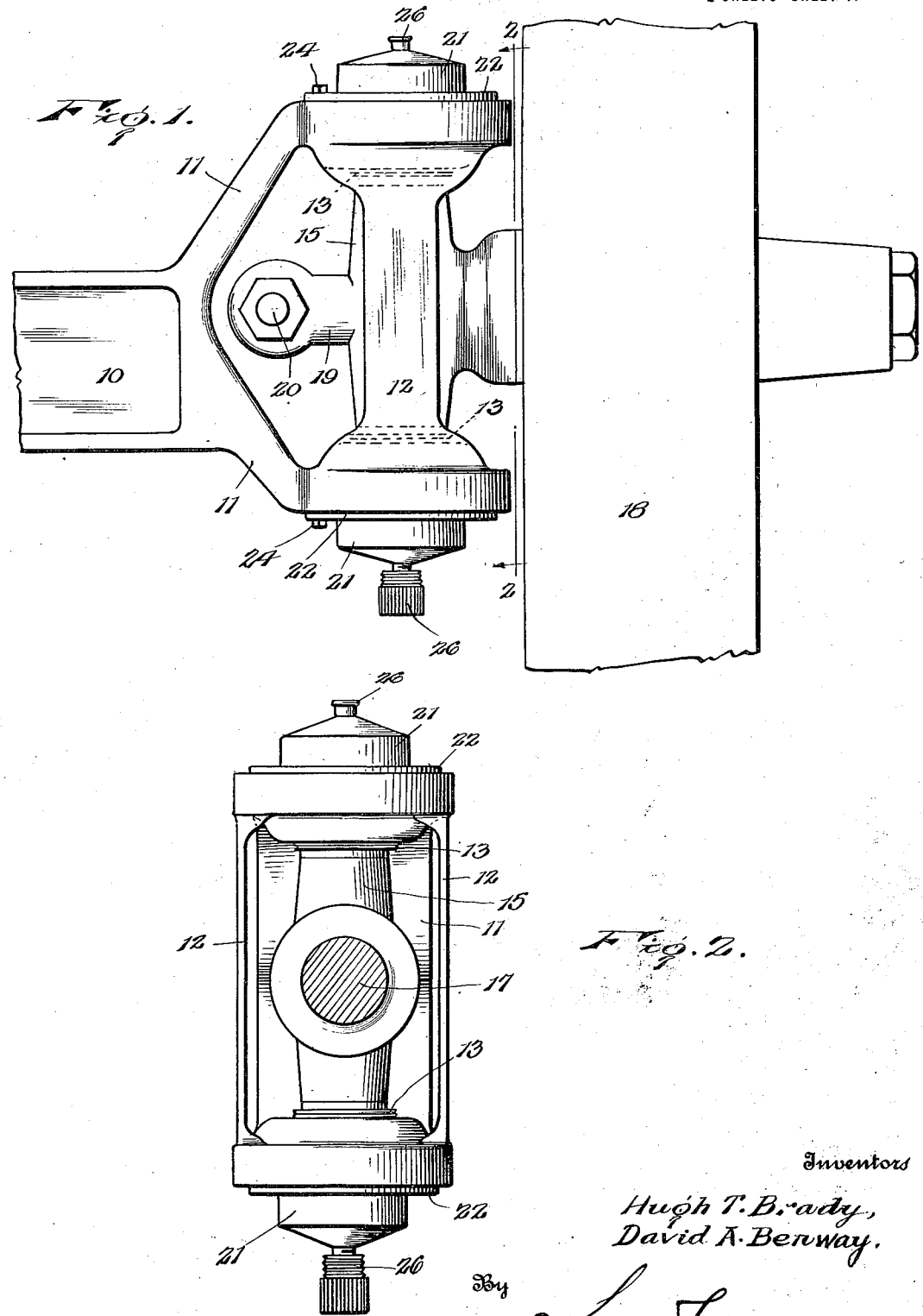
Inventors
Hugh T. Brady,
David A. Benway.
By Lacey & Lacey, Attorneys

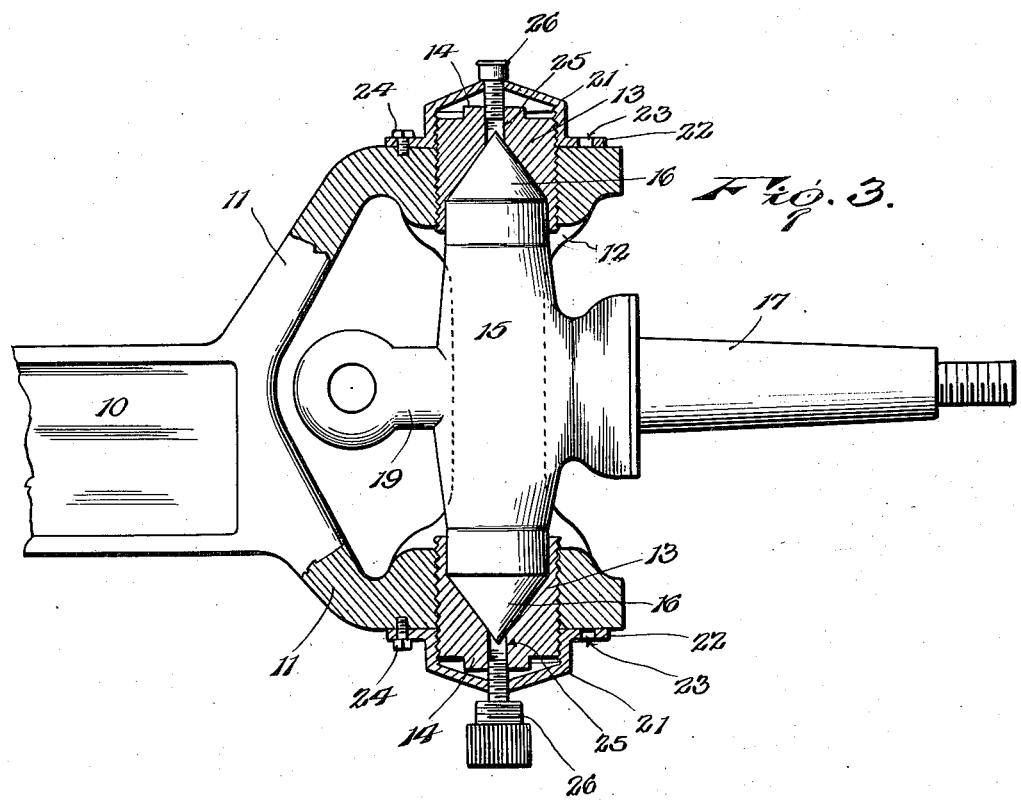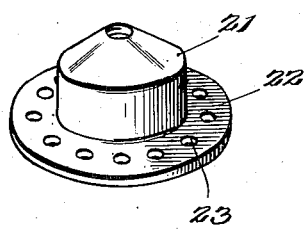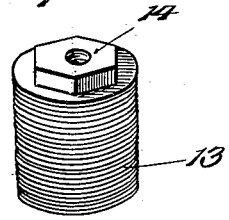

Patented Dec. 12, 1922.

1,438,214

UNITED STATES PATENT OFFICE.

HUGH THOMAS BRADY AND DAVID A. BENWAY, OF BAY CITY, MICHIGAN.

FRONT AXLE FOR MOTOR VEHICLES.

Application filed April 28, 1921. Serial No. 465,089.

*To all whom it may concern:*

Be it known that we, HUGH T. BRADY and DAVID A. BENWAY, citizens of the United States, residing at Bay City, in the county of Bay and State of Michigan, have invented certain new and useful Improvements in Front Axles for Motor Vehicles, of which the following is a specification.

This invention relates to an improved front axle for motor vehicles and has as one of its principal objects to provide an axle embodying means which may be adjusted for taking up wear in the bearings of the steering knuckles of the axle.

The invention has as a further object to provide an axle wherein the usual steering knuckle king bolts and brass bushings will be eliminated.

And the invention has as a still further object to provide an axle employing an individually adjustable bushing at each end of each of the steering knuckles and wherein said bushings may be securely locked in adjusted position.

Other and incidental objects will appear hereinafter.

In the drawings:

Figure 1 is a fragmentary front elevation showing one end portion of the axle and the adjacent steering knuckle thereof, Figure 2 is a vertical sectional view on the line 2—2 of Figure 1, looking in the direction of the arrows, Figure 3 is a fragmentary elevation partly broken away and shown in section to illustrate the bushings of the knuckle, Figure 4 is a perspective view showing one of the bushings in detail, and Figure 5 is a detail perspective view showing one of the locking caps for the bushings.

Referring now more particularly to the drawings, we employ an axle beam 10 provided at each end thereof with a yoke having spaced arms 11, and since the yokes and associated parts at opposite ends of the axle are identical, only one yoke and corelated parts will be described in detail. Connecting the arms 11 at their forward and rear sides are, as particularly shown in Figure 2 of the drawings, parallel tie members 12 extending between the free end portions of said arms and, as will be observed, the uppermost of said arms is provided with a flat upper face while the lower arm is provided with a flat lower face. Threaded through said arms from the upper and lower sides thereof respectively are bushings 13 each provided at its outer end, as best shown in Figure 4, with a hexagonal wrench receiving boss 14 so that said bushings may be readily adjusted and, of course, the bushings are arranged in alinement. Journaled between said bushings is a knuckle 15 provided at its ends with conical bearings 16 fitting in the bushings so that the knuckle is thus supported for oscillatory movement between said bushings. Extending from the knuckle at its outer side is a spindle 17 designed to support a front wheel as conventionally illustrated in Figure 1 at 18, and extending from the knuckle at its inner side, preferably in alinement with said spindle, is an eye 19 to which is connected a steering arm 20.

As best shown in Figure 3, the bushings 13 project above and below the arms 11 respectively and threaded upon said bushings are locking caps 21 housing the bushings. As shown in detail in Figure 5, these caps are each provided with an annular base flange 22, said flanges being disposed to seat flat against the flat upper and lower faces of the arms respectively, and formed in each of the flanges is a series of circumferentially spaced openings 23. Selectively engageable through said openings are cap bolts 24 threaded into the arms 11 to secure the caps against counter-rotation. Thus, the caps will serve to firmly lock the bushings upon the arms 11 to properly support the knuckle 15. The bushings are provided axially with passages 25 leading to the bearings 16 of said knuckle and threaded into said passages are appropriate grease cups 26 extending freely through the caps, the uppermost of said cups being constructed for the reception of oil while the lowermost of said cups is adapted to contain a hard lubricant and has an adjustable cap for feeding the lubricant. Thus, the bearings 16 may at all times be easily kept properly lubricated.

As will now be readily understood in view of the preceding description, by removing the caps 21, the bushings 13 may be readily adjusted for taking up wear upon the bearings 16 of the knuckle or upon said bushings. Then, by again applying the caps, the bushings may, as previously explained, be securely locked in adjusted position. In this connection it is to be observed that the tie members 12 will rigidly brace the arms 11 against spreading strain such as might be brought about by adjustment of the bushings, and, as will be noted, said tie members are so located that the presence of the members upon the yoke will not interfere with the oscillatory movement of the knuckle. When the bushings become worn out, said bushings may, as will be seen, be readily renewed so that undue looseness of the knuckle may at all times be avoided.

Having thus described the invention, what is claimed as new is:

1. An axle provided with a yoke having spaced arms, bushings threaded through the arms and provided with flared bores in their inner opposed ends and central openings leading through their outer ends into said bores, a knuckle having conical ends journaled in said flared bores of the bushings, caps threaded upon the outer ends of the bushings, means securing the locking caps to the arms in a set position, and lubricating cups threaded centrally through the caps and into the central openings in the bushings.

2. An axle provided with a yoke having spaced arms, bushings threaded through the arms and provided with flared bores in their inner opposed ends and central openings leading through their outer ends into said bores, a knuckle having conical ends journaled in said flared bores of the bushings, caps threaded upon the outer ends of the bushings, and means securing the locking caps to the arms in a set position.

In testimony whereof we affix our signatures.

HUGH THOMAS BRADY. [L. S.]
DAVID A. BENWAY. [L. S.]